United States Patent [19]
Kobayashi

[11] Patent Number: 5,238,643
[45] Date of Patent: Aug. 24, 1993

[54] VULCANIZATION METHOD FOR ELASTOMER PRODUCT

[75] Inventor: Michihito Kobayashi, Toyota, Japan

[73] Assignee: Sumitomo Rubber Industries Limited, Kobe, Japan

[21] Appl. No.: 837,083

[22] Filed: Feb. 18, 1992

Related U.S. Application Data

[63] Continuation of Ser. No. 588,092, Sep. 25, 1990, abandoned.

[30] Foreign Application Priority Data

Sep. 30, 1989 [JP] Japan .................. 1-256829
Nov. 22, 1989 [JP] Japan .................. 1-303922

[51] Int. Cl.$^5$ ............................. B29C 35/04
[52] U.S. Cl. ................... 264/501; 264/40.3; 264/85; 264/572; 264/315; 264/326; 264/DIG. 50; 425/29; 425/42; 425/44
[58] Field of Search ............... 264/315, 326, 40.3, 264/85, 572, 501, DIG. 50; 425/29, 42, 44, 135

[56] References Cited

U.S. PATENT DOCUMENTS

| | | | |
|---|---|---|---|
| 3,002,228 | 10/1961 | Salem et al. | 264/315 |
| 3,329,748 | 7/1967 | Hugger | 264/315 |
| 4,097,565 | 6/1978 | Cole et al. | 264/315 |
| 4,222,721 | 9/1980 | Gado | 264/315 |
| 4,370,283 | 1/1983 | Arimatsu et al. | 264/315 |
| 4,382,052 | 5/1983 | Arimatsu | 264/315 |

FOREIGN PATENT DOCUMENTS

| | | |
|---|---|---|
| 0050956 | 5/1982 | European Pat. Off. . |
| 1729839 | 7/1971 | Fed. Rep. of Germany . |
| 57-74142 | 5/1982 | Japan . |
| 57-185134 | 11/1982 | Japan . |
| 59-42942 | 3/1984 | Japan .................. 264/315 |
| 62-33611 | 2/1987 | Japan . |

Primary Examiner—Jan H. Silbaugh
Assistant Examiner—Mathieu Vargot

[57] ABSTRACT

A method of vulcanizing an elastomer product such as a tire including placing the product in a mould, supplying a heating medium to the interior of the product to effect vulcanization, then supplying a pressurizing medium to the interior of the product. In this method the heating medium or the heated fluid mixture is exhausted or removed from the interior of the product at least once by opening an exhaust and simultaneously supplying a cooling pressurizing medium to cool the product to a required temperature level. The heating medium may be exhausted immediately after the completion of the heating medium supply process. The heated fluid mixture may be exhausted in and/or after the pressurizing medium supply process. Preferably the rate of exhaustion is limited by a control orifice. As a result the product is cooled without giving temperature differences in different parts of the product and avoiding unfavorable pressure drop so that efficient vulcanization with good homogeneity in the product results.

12 Claims, 9 Drawing Sheets

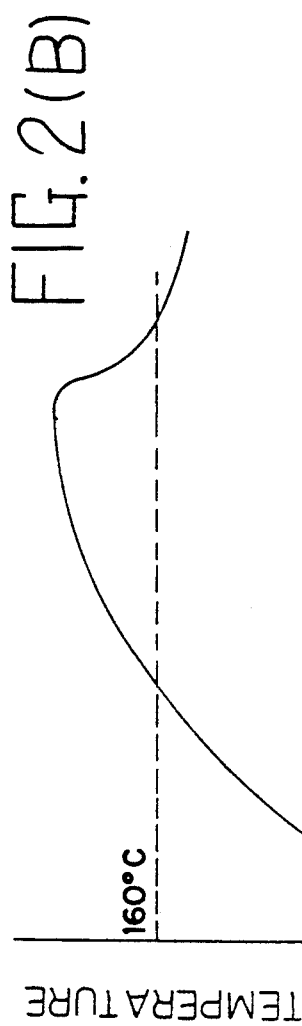
FIG. 2(B)
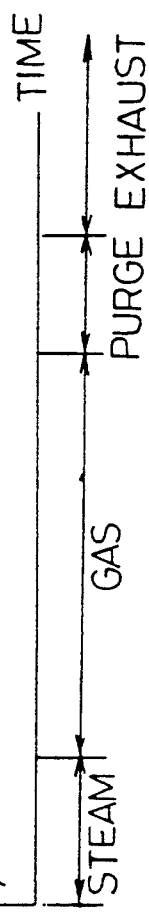
FIG. 6(B)
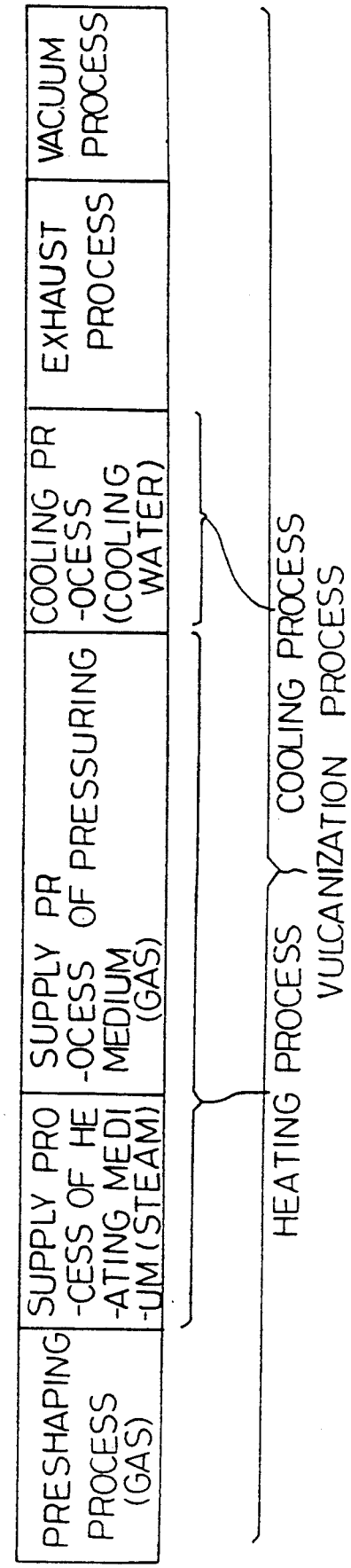

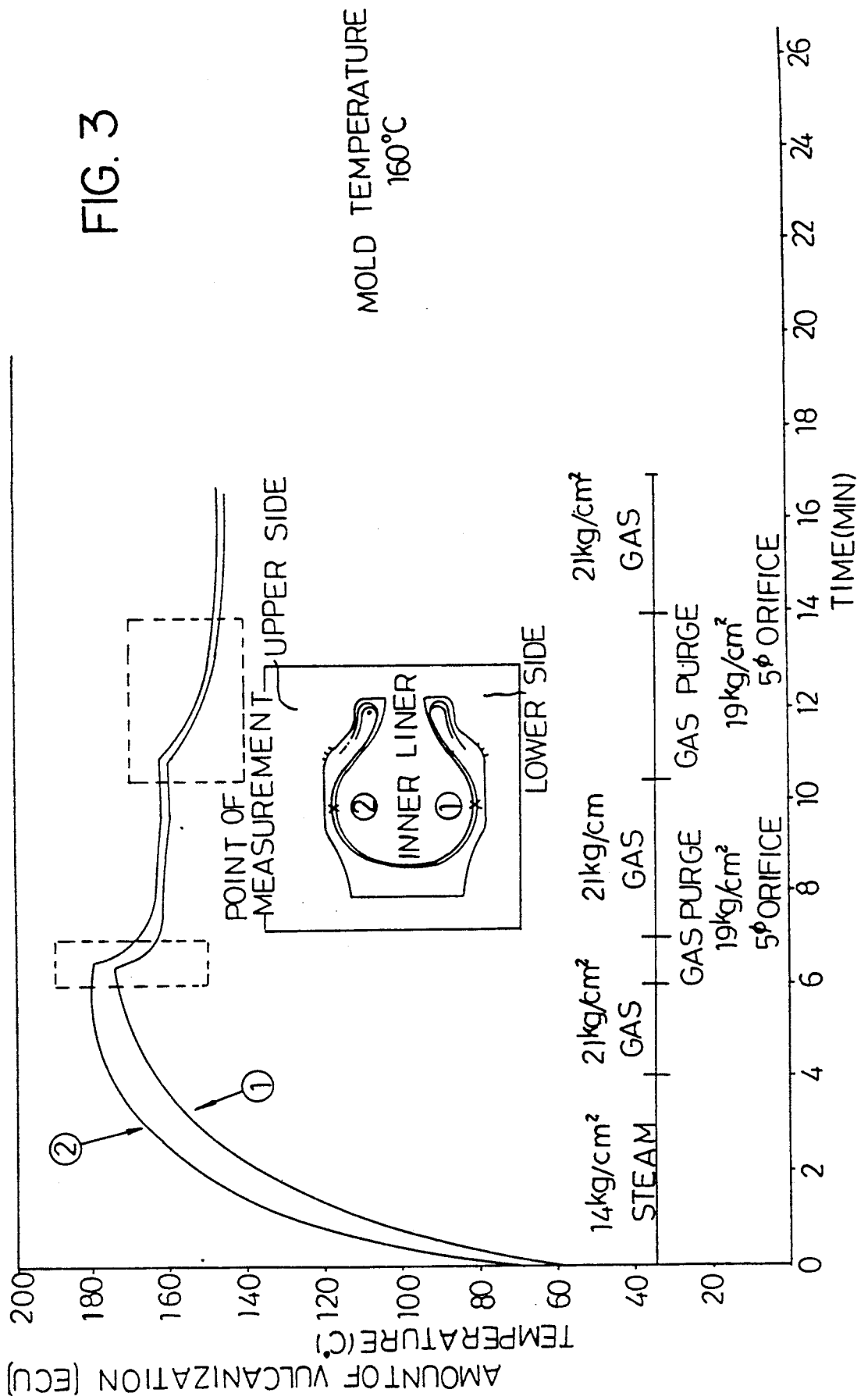

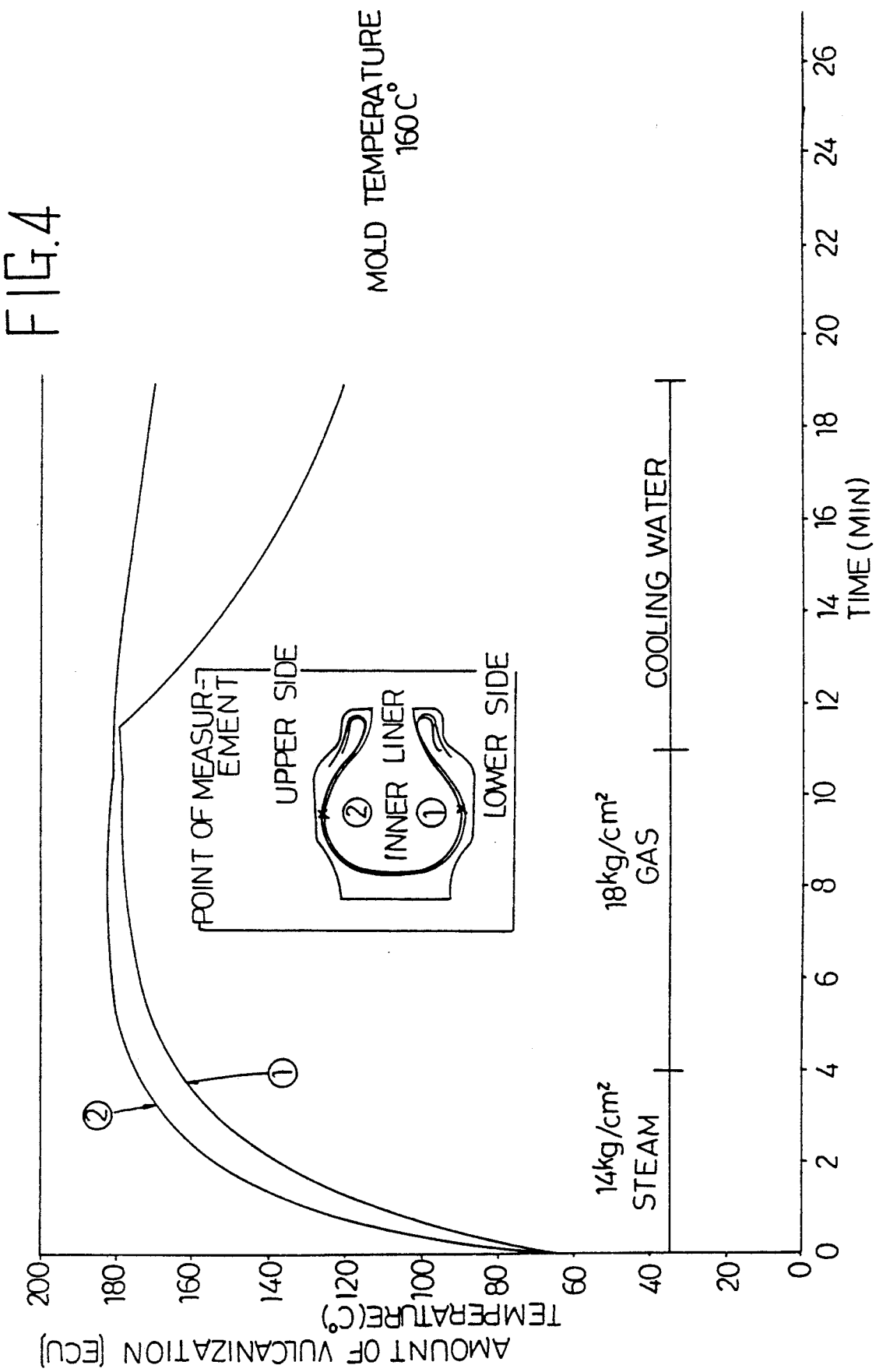

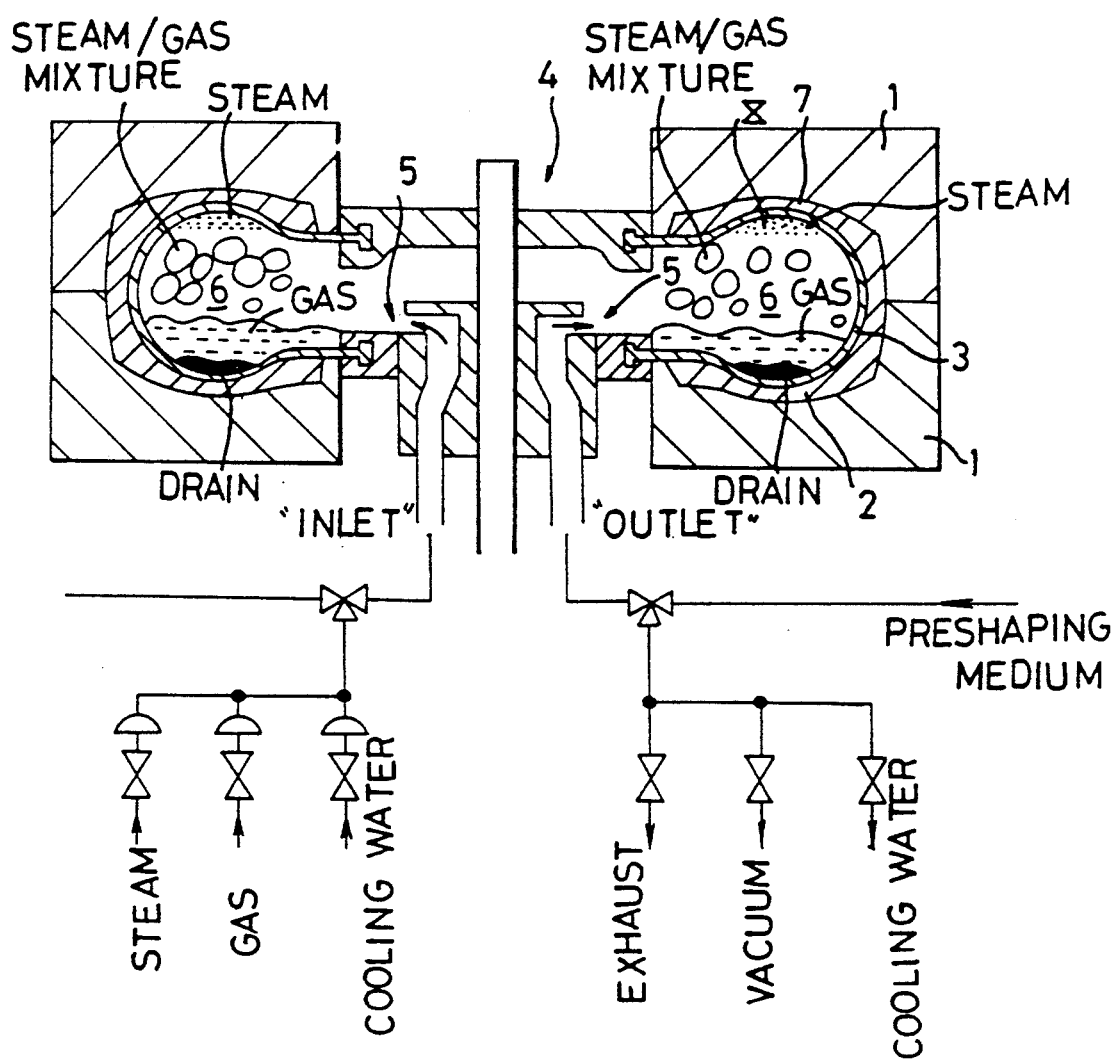

VULCANIZATION METHOD FOR ELASTOMER PRODUCT

This application is a continuation of application Ser. No. 07/588,092 filed on Sep. 25, 1990, now abandoned.

FIELD OF THE INVENTION AND RELATED ART STATEMENT

The present invention relates to a method of vulcanization of elastomer products, especially of a rubber tire for vehicles, using gas as a pressurizing medium. The present applicant disclosed a method of vulcanization of elastomer products such as a rubber tire for a vehicle in the Unexamined Japanese Patent Publication SHO 57-74142, whose outline is as follows: As illustrated in FIGS. 6A and 6B, green rubber tire 2 is placed in a mould 1 and a bladder 3 is inflated so as to provide the inner surface of the mould alternatively without the use of the bladder 3, a heating medium or steam or heated gas of a predetermined temperature and pressure is supplied directly into the internal space 6. In each case the "outlet" pipe line is closed and therefore steam does not circulate, i.e. in a dead-end state. When the tire 2 reaches the standard temperature for vulcanization, or after a standard time, the supply of the heating medium is stopped and a pressurizing medium (a combustion gas, nitrogen gas or others) with the same or a higher pressure than the heating medium is supplied to the interior of tire through a blowing exit 5 positioned in at the central mechanism of the vulcanization machine. Once again the "outlet" pipe is kept closed to prevent circulation of gas. By this high pressure gas, the internal pressure in the tire 3 is maintained at the same level or raised to a higher level and maintained until the end of the remaining period of the heating steps for vulcanization. Then in case of Nylon 6 tire carcass ply material or when adjustment of the degree of vulcanization is required for a tire carcass of another material, cooling water is circulated in the internal space 6 after completion of the heating process and thus the tire 2 is cooled down to a predetermined temperature. After this procedure, the fluid mixture of the heating and pressurizing medium or the fluid mixture of the heating medium and cooling water is exhausted (into the atmosphere) through an exhaust line. Then by applying a vacuum, the bladder is shrunk to assist removal from the tire 2 and the mold 1 is opened and the vulcanized tire 2 is taken out to end the vulcanization process.

This cooling process may not be applied to a tire whose carcass ply is made of Nylon 66, polyester or steel cord.

A difficulty when cooling water is circulated in the internal space of the tire in the cooling process is that the fluid mixture (gas) remains in the upper part X of the internal space 6 and cooling of the upper side wall part 7 of the tire 2 is effected and, as a result, a large temperature difference (typically as 50° C.) between the upper side wall and other parts, especially the lower side wall 1 results and this temperature difference cannot completely be removed until the end of whole vulcanization process. Therefore the degree of vulcanization in the upper and the lower parts of the tire is different and this causes tire quality deterioration. Also the cooling time required to prevent loss of cord strength for Nylon 6 is too long and this results in markedly decreased productivity.

Furthermore, when cooling water is employed in the gas vulcanization, any leak from the cooling water valve goes into the internal space of the tire, which gives rise to undercure trouble (deficient vulcanization). Moreover the pipe line and the bladder are cooled down by the cooling water and drainage of heating medium (steam) in the internal space of the tire is accelerated to delay the vulcanization.

Additionally, another disadvantage which takes place in the heating process of the vulcanization system using gas as a pressurizing medium is that drain water from the steam stays in the tire side wall region of the lower-mold and after supply of the pressurized fluid, gas also stays in the area of the tire bead of the shoulder portion in the lower-mold, due to insufficient mixing. This causes a temperature difference between the area from the tire bead to the shoulder portion in the lower-mold. Consequently, a tire vulcanization time has had to be determined in accordance with the cure of, for example, the tire bead or tire shoulder portion in the lower-mold, where vulcanization goes slowest. However, such a counter measure causes a problem in that the upper tire bead or shoulder portion in the upper-mold in opposite would inevitably result in an overcure compared with the tire bead or tire shoulder portion in the lower mold. Generally the longer the steam heating time becomes, the higher the temperature of both upper and lower tire bead or tire shoulder portions becomes with the temperature difference noted above. However, an excessively long time of the steam process would cause an excessively high temperature of the upper tire bead or shoulder portion, which would deteriorate the physical properties of the cords and the rubber of the carcass in the upper-mold.

As for the lower tire bead or shoulder portion at the lower-mold, a higher temperature obtained by heating for a longer time contributes to shorten a vulcanization time or improvement in the productivity. Nevertheless, in order to prevent the temperature of the upper tire bead or shoulder portion noted above at the upper mold from rising excessively, the heating time is generally determined for the purpose of controlling the temperature of the upper tire bead or shoulder portion at the upper-mold.

However, desirable improvement in the vulcanization process to raise the productivity (i.e., shortening of the cure time) lies in achievement of faster temperature rise on the lower tire bead or shoulder portion where vulcanization goes slowest and in achievement of temperature rise in the lower tire bead or shoulder portion to a level where physical properties of tire components are not deteriorated, without inviting an excessively high temperature of the upper tire bead or shoulder portion at the upper-mold.

OBJECTS AND SUMMARY OF THE INVENTION

An object of the present invention is to solve the above problems and to provide a vulcanization method, where a homogeneity in the degree of vulcanization is obtained by cooling without giving rise to temperature difference between different parts of the elastomer product and furthermore to prevent undercure trouble or delay in vulcanization.

Accordingly the invention provides a vulcanization method of elastomer products, especially rubber tire for vehicles including a supply process of a heating medium to be followed by a supply process of a pressurizing medium. In and/or after the above supply process of a pressurizing medium, at least part of or the whole of a fluid mixture of a heated heating medium and a pressurizing medium filled in an internal space of an elastomer product in the mold is exhausted at least once for a predetermined time by means of an "outlet" pipe line of the vulcanization machine whose flow rate was adjusted and substituted by an unheated pressurizing medium to cool down the elastomer product at a desired temperature level. The flow rate can be adjusted by installing an orifice with a diameter less than 20 mm at an "outlet" pipe line of the above vulcanization machine.

A second embodiment of the present invention is, that immediately after the completion of a heating medium supply process and before the start of a pressurizing medium supply process at least part of or the whole of the heated heating medium filled in an internal space of elastomer product in the mold is exhausted for a predetermined time, by opening the "outlet" pipe line of the vulcanization machine whose flow rate is adjusted, and is replaced by an unheated pressurizing medium and then the "outlet" pipe of the above vulcanization machine is closed.

According to the first embodiment of the present invention, at least part of or the whole of the heated fluid mixture, filled in an internal space of elastomer product in the mold, is so-called gas-purged for a predetermined period and replaced by an unheated pressurizing medium and the elastomer product is cooled down at a desired temperature. Further in gas-purging, the exhausting flow rate is adjusted so that the pressure drop of the internal space of elastomer product is controlled in an allowed range so that no large temperature difference at portions of the elastomer product in the mold results and efficient cooling is obtainable without an unfavorable pressure drop. Therefore, the present invention can not only provide a homogeneity in the degree of vulcanization, but can certainly prevent troubles such as a delay of vulcanization.

According to the second embodiment of the present invention, at least part of or the whole of the heating medium, filled in an internal space of the elastomer product in the mold, is so-called gas-purged for a predetermined period and replaced by an unheated pressurizing medium immediately after the completion of the heating medium supply process and prior to the start of the pressurizing medium supply process.

Therefore, the temperature of the upper tire bead or shoulder portion at the upper-mold where vulcanization goes faster is prevented from rising excessively while the temperature rise in the lower tire bead or shoulder portion at the lower mold is accelerated, with a result that homogeneous cure at the upper and lower tire bead or shoulder portions at both the upper and lower molds and a shorter cure time are realized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2(B) is a graph showing the relation between temperature and time when a gas purge cooling was undertaken after the gas supply process;

FIG. 3 is a graph showing the temperature difference between the upper and lower side walls of a tire in the mold when gas purge cooling was undertaken twice in the gas supply process;

FIG. 4 is a graph showing the temperature difference between the upper and lower side walls of a tire in the mold using gas vulcanization with the conventional cooling method;

FIG. 6(A) is a part sectional view of a vulcanization machine and a diagram showing the internal pipe line system thereof, for achieving gas vulcanization by use of the conventional cooling system; and FIG. 6(B) is a diagram showing the process of gas vulcanization by use of the conventional method.

DESCRIPTION OF THE PREFERRED EMBODIMENTS

In the following, examples of the present invention are explained in detail for a vehicle rubber tire with reference to the Figures. The gas vulcanization method according to the present invention is principally the same as the conventional method except for the cooling process and the explanation is therefore abbreviated.

Figure 1A:
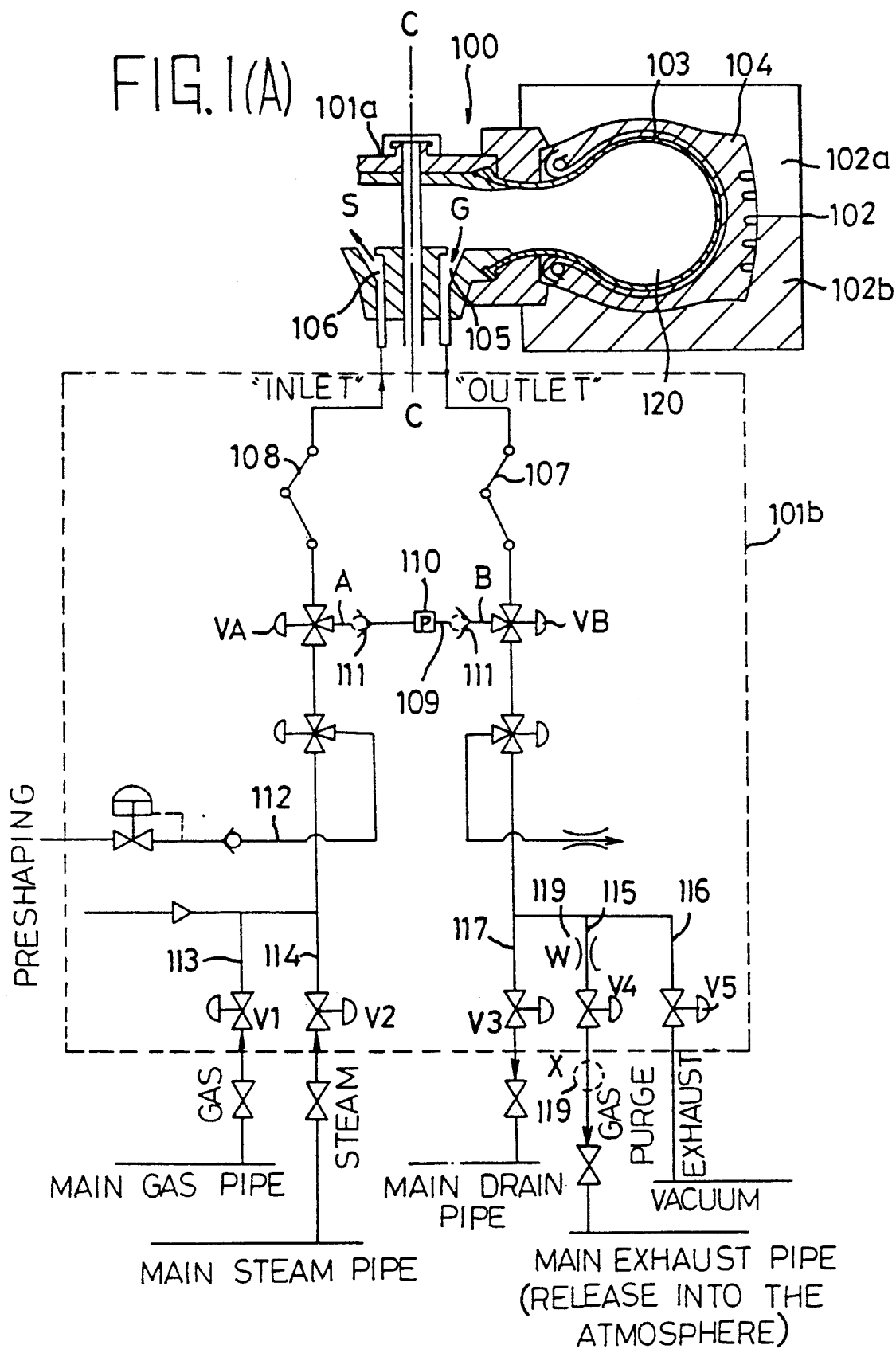
FIG. 1(A) is a part sectional view of a right half of the vulcanization machine showing the control system for the "outlet" pipe line and "inlet" pipe line systems thereof.

FIG. 1 shows the vulcanization apparatus 100 which is composed of a mould assembly 101a and internal pipe line system 101b. The mould assembly 101a includes a mold 102, composed of an upper mold 102a and a lower mold 102b, and bladder 103 in the form of a rubber bag.

An unvulcanized tire 104 is placed between the upper and lower mold 102a, 102b by means of the bladder 103 and subjected to heat and pressure. In another example, no bladder is employed.

A blowing port 106 and an exhaust 105 in the main part of the vulcanization machine 101a are connected to a supply source, although not shown in the Figure, of vulcanization medium by an internal pipe line system 101b. The internal pipe line system 101b can be separated into an "inlet" part, which supplies vulcanization medium to the vulcanization machine 101a, and an "outlet" part, which takes out used vulcanization medium exhausted from the main part 101a. In this Figure, 107 is a flexible pipe line at the "outlet" port and 108 is a flexible pipe at the "inlet" port.

In an internal pipe line system 101b of this vulcanization machine 100, a circulation pipe 109 for a forced circulation pathway of vulcanization medium is positioned between the "inlet" and "outlet" sides, as in the previous application filed by the present applicant (Unexamined Japanese Patent Publication SHO 62-33611). This pipe line has an adjustment valve VA at the "inlet" side and an adjustment valve VB at the "outlet" side. A pump P and a back-flow protection valve 111 are installed for a forced circulation equipment 110 and the vulcanization medium in the internal space of the tire can be favorably circulated during the vulcanization to eliminate temperature fluctuations by an effect similar to forced stirring in the mold.

Figure 1B:
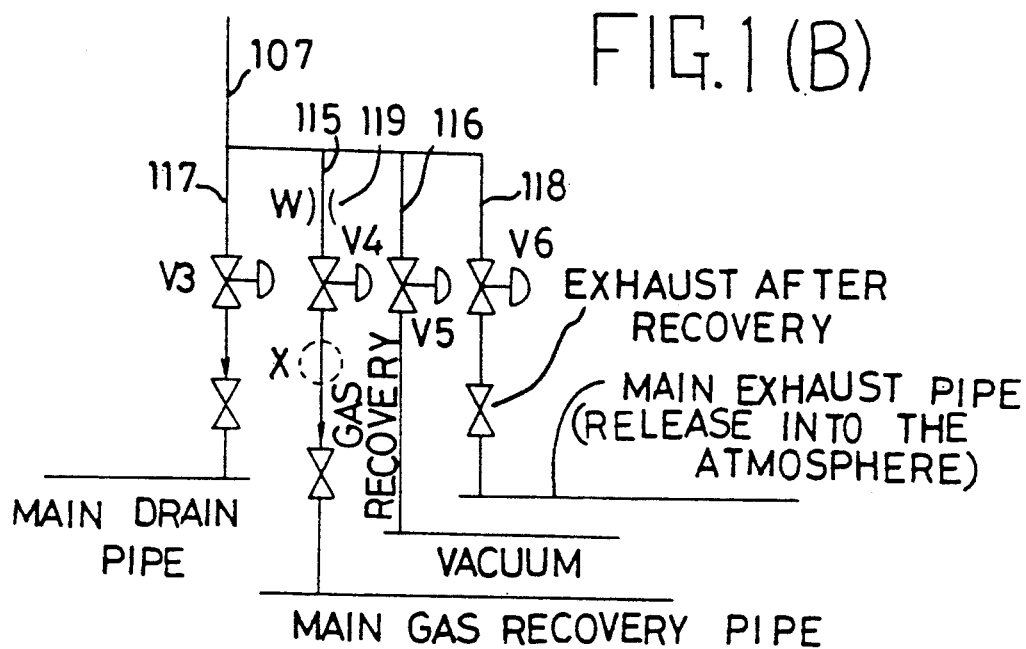
FIG. 1(B) shows the outlet pipe line control system of FIG. 1(A) modified to allow gas recovery.

Numeral 112 indicates a supply pipe for fluid (gas, steam or the like) for a preshaping process prior to the heating process and 113 is a supply pipe for pressurizing medium (low temperature gas such as nitrogen or the like). Numeral 114 shows a supply pipe for a heating medium (steam and heated gas). These three along with the above flexible pipe line 108 constitute the "inlet" pipe line system. Numeral 115 indicates a gas exhaust pipe for a fluid mixture and 116 is a vacuum pipe and 117 is a drain pipe. These three along with the above flexible pipe line 107 constitute the "outlet" pipe line system. By connecting a gas exhaust pipe 115 to the main recovery pipe, as shown in FIG. 1(B), the exhaust gas can be recovered and reused for preshaping. In the above "outlet" pipe line system, an orifice 119 of the known structure is installed at a position W in front of an automatic adjustment valve V4 for the gas exhaust pipe (or gas recovery pipe) 115 or at a position X (illustrated by a broken circle) after an automatic adjustment valve V4 to adjust the pipe line flow. The diameter of the orifice 119 is less than 20 mm, preferably in the range of 3.0 mm to 10 mm. If the orifice diameter is too large, the pressure loss in the internal space 120 of the tire becomes too large on purging the gas, which gives rise to defects in outside appearance of tire such as bareness, porosity on the tire surface and troubles such as a double molding of lettering on the side wall. On the other hand, if the orifice diameter is too small, pressure loss can be avoided, but it takes too long for gas purging to give the cooling effect at the desired level and also blocking of the pipe tends to occur. In use of the valcanization apparatus when, or after the step of supplying pressurizing medium, in which gas is continuously supplied while keeping the "outlet" pipe line in a closed state (dead end) in a similar way to the supply process for the heating medium, an "outlet" pipe line 115, with the above orifice 119, is opened for a predetermined time and at least part of or all of the fluid mixture of a heated steam and a gas, which fills the internal space 120 of tire 104 in the mold 102, is exhausted. At the same time as this exhaust operation, an unheated pressurizing fluid (a new gas from a gas tank, which has never been introduced into the internal space 120 of the tire or a used gas through a pipe line 109 in the case of a vulcanization machine having a forced circulation pipe line 109) is introduced to fill the internal space 120 of the tire. Thus the fluid mixture at a high temperature in the internal space 120 of the tire is replaced by a pressurizing fluid at a low temperature, that is, a gas purge cooling is undertaken.

Figure 2A:
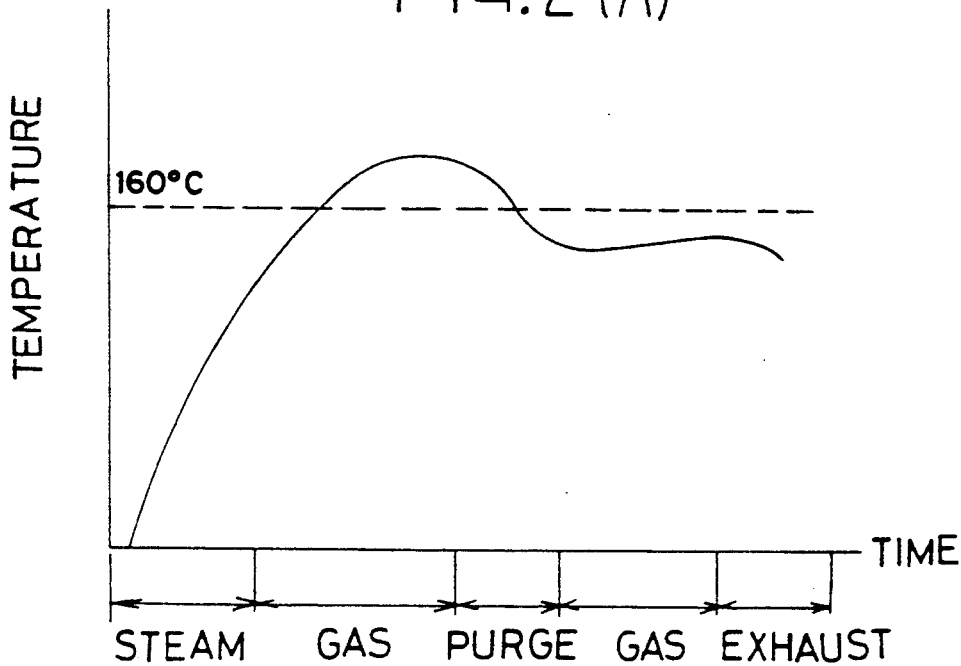
FIG. 2(A) is a diagram showing the relation between temperature and time for a gas purge cooling in the gas supply process.

The timing of the gas purge cooling depends on the cooling requirement. In other words, in the case where a tire is made of a Nylon 6 cord carcass (Nylon 6 cord is generally known to suffer a decrease of elongation strength when tension is removed by releasing the pressure to zero at the end of the vulcanization from a state where tension has been applied to the cord during vulcanization at a temperature higher than 160° C.) the cooling is undertaken only to protect the decrease of strength of nylon cord. Then it is safe if the tire temperature is decreased to lower than 160° C. by the time of release of the pressure of the internal tire space at the end of vulcanization. Therefore, a gas purge cooling step can, as shown in FIG. 2(A), either be undertaken in a supply step of a pressurizing medium (gas), or as shown in FIG. 2(B), be undertaken after a supply step of a pressurizing medium (gas and prior to a gas exhaust process) (i.e. at a later stage of vulcanization). In the case that a gas purge cooling is undertaken at the supply steps of the pressurizing medium, the temperature becomes lower because of the earlier timing of the gas purge, compared with the case where it is undertaken after the supply step of the pressurizing medium and accordingly it takes a longer vulcanization time.

In order to increase the homogeneity of the degree of vulcanization by solving the problem of temperature difference, due to the drain collected at the lower side wall, between the upper side wall of the tire in the mold and the lower side wall, i.e. the problem in the conventional gas vulcanization method, or in order to control the degree of vulcanization for the tire having carcass cord such as polyester, Nylon 66 or the like, which suffer no decrease of strength even at a high temperature, so that the temperature is raised in an earlier state of vulcanization and then decreased during the vulcanization so as not to overcure the inner liner or the carcass, i.e., in order to keep the temperature in the internal space of the tire low and to vulcanize for a longer period without causing a temperature difference between the upper and the lower side walls, a gas purge cooling operation can be undertaken in the supply step for the pressurizing medium (gas), as shown in FIG. 2(A).

The gas cooling is usually undertaken once, but of course it is not so restricted. For example, in the case of Nylon 6 carcass tire, a temperature difference due to the accumulation of drain between the upper and lower side walls of the tire can be solved by the 1st gas purge cooling (in the gas supply process), and the tire temperature can be decreased lower than the limit of 160° C. by the 2nd gas purge cooling (after the gas supply process).

The cooling effect on the tire in the mold depends on the diameter of the orifice installed in the "orifice" pipe line and the period of the gas purge cooling, but the most important point for determining the cooling effect is to what extent the pressure in the internal space safely can be decreased. If it is decreased beyond the allowed pressure drop level (e.g. ca. 7 kg/cm$^2$), bareness or prorosity is caused or troubles of double molding of side wall lettering is caused. The desired pressure of the internal space of the tire on gas purge cooling can be adjusted (e.g. 19 kg/cm$^2$) by the original pressure of the gas to be purged (e.g. 21 kg/cm$^2$), the orifice diameter (e.g. 5 mm) and for the "inlet" pipe line diameter (e.g. 16 mm). Firstly the orifice diameter is determined so that the pressure drop in an internal space of the tire is within the allowed range. This orifice is attached to the "outlet" pipe line and the tire is actually gas-vulcanized with the gas-purge cooling and temperature data of the tire as formed by repeated experimental work to obtain how long a gas purging step is required and at what size (mm's) of orifice diameter to obtain the required cooling effect.

Whether a fluid mixture of high temperature in the internal space of the tire in the mold is certainly replaced by the gas purging to a fluid of low temperature or not can easily be confirmed by a pressure graph. According to the method of present invention, shown in FIG. 3, a gas vulcanization of automobile tire of 185SR13 size having Nylon 6 carcass ply in a BOM mold (at a temperature of 160° C.) will be explained in the following. An an orifice of a diameter of 5 mm was installed at a position W in the gas exhaust pipe 115, valves V3–V4 of the "outlet" pipe line are closed and the valve V2 at the "inlet" pipe line is opened to supply steam at a temperature of 180° C. with a pressure of 14 kg/cm$^2$. After the lapse of a standard time of 4 min, the valve V2 is closed to stop the supply of steam and the valve V1 is opened to supply a gas at a pressure of 21 kg/cm$^2$ and at a temperature of 40° C. and then after the lapse of 2 min, the gas purge cooling, shown in FIG. 1, is undertaken. In other words, only the valve V4 of the gas exhaust pipe 110 is opened to exhaust (release into the atmosphere) the heated fluid mixture (at its pressure of 21 kg/cm$^2$ and temperature of 180° C.) for the internal space 120 of the tire and to fill the internal space 120 with gas at a pressure of 21 kg/cm$^2$ but at a temperature of 40° C. instead.

After the lapse of 1 min (when the pressure in the internal space 120 is decreased to about 19 kg/cm$^2$, but the temperature of the inner liner of tire is decreased to about 168° C., for example, at the upper side wall 2 and the temperature difference between the upper and the lower side walls 1 and 2 is reduced to about 3° C. and the homogeneity of the degree of vulcanization is thus increased), valve V4 in the gas exhaust pipe 115 is closed while supplying the gas continuously. After the lapse of 3.5 min (when the pressure in the internal space 120 is then recovered to 21 kg/cm$^2$ and the temperature of the inner liner of tire is decreased to about 165° C. at the upper side wall 2), the 2nd gas purge cooling is undertaken. In other words, the valve V4 in the gas exhaust pipe 115 is opened again to exhaust the gas filling the internal space of the tire and to fill the internal space 120 with the gas at a pressure of 21 kg/cm$^2$ and a temperature of ca. 40° C. instead. After the lapse of 3.5 min, (when the pressure in the internal space 120 has fallen to about 19 kg/cm$^2$, and the temperature at the upper side wall 2 of the inner liner of the tire is decreased to about 148° C., i.e. lower than the temperature level of about 160° C., where no decrease of the strength is induced even at zero pressure of the internal space of tire 120 and the temperature difference between the upper and lower side walls 1 and 2 is decreased to about 2° C. and the homogeneity of the degree of vulcanization is further increased), the valve V4 in the gas exhaust pipe 115 is closed to the continuous supply of gas. Then after the lapse of 3 min, the valve V1 in the gas supply pipe 113 is closed to stop the supply of gas and the valve V4 in the gas exhaust pipe 115 is released to exhaust the gas from the internal space 120 of the tire to decrease the pressure to zero.

Then by applying vaccum, the bladder 103 is shrunk to assist stripping of the tire and then the mold 109a is opened to take out the vulcanized tire 2 to finish the whole vulcanization process.

As it is clear in the above explanation, the fluid mixture in the present invention means a gas mixture of a vulcanizing medium (steam, heated gas or the like) and for the pressurizing medium (nitrogen gas, air or the like). As detailed above, the first embodiment of the present invention, the gas purge cooling is carried out in or after the pressurizing medium supply process, by opening the "outlet" pipe line of the vulcanization machine for a predetermined period with use of an orifice, thereby a flow rate is adjusted. Thus, a significant temperature difference between various portions of an elastomer product is avoided and an unfavorably big pressure drop is also avoided to effectively cool down the elastomer product toward not only achieving homogeneous vulcanization, but minimizing cure delay trouble, etc.

The following describes the second embodiment of the present invention, where the timing of the gas purge is set immediately after the supply process of the heating medium.

That is, when the supply process of heating medium is completed, the "outlet" pipe line 115 with the orifice 119 is opened immediately for a predetermined period so that at least part of or all of the steam in the internal space 120 of the tire 104 set in the mold 102 is exhausted. As this purge proceeds, an unheated pressurizing gas which comes from the "inlet" pipe line 106 as noted before is introduced into the inner space 120 of the tire to replace the preexisting heating gas being purged. (The unheated pressurizing gas is a new gas which has never been supplied to the space 120 from the gas tank, or in the case that a forced circulatory line is equipped, a used gas which has been cooled and which is supplied via this forced circulatory line.) In short, the gas purge cooling is effected by replacing the heated heating medium preexisting in the internal space 120 with a low temperature pressurizing medium which is finished by closing the "outlet" pipe line 115.

The cooling effect for the tire 104 in the mold 102 depends on the diameter of the "outlet" pipe and the time period for the gas purge. The first point in determining a cooling effect is for a tire 104 lies in to what extent the pressure inside the internal space 120 can be reduced. If an actual pressure drops below an allowable level for pressure reduction (for example, 7 kg/cm$^2$), such troubles as the bareness and porosity or double molding of side wall lettering will take place. From the original pressure of a gas to be purged (for example, 21 kg/cm$^2$), the diameter of the orifice (for example, 5 mm), and the diameter of "inlet" pipe line for the gas (for example, 16 mm), a desirable pressure level of the internal space (for example, 19 kg/cm$^2$) at the time of gas purge cooling can be determined. The time period for the gas purging is determined experimentally with sequential steps as below: first, an orifice diameter is determined so that reduction of a pressure inside the internal space 120 will stay within the allowable range, and then a number of experimental cure using such an allowable orifice attached to the "outlet" pipe line including the gas purge is carried out and a temperature data of a tire 104 is obtained. Through repeating such experimental work, we are able to determine how long the gas purging should be effected with use of what diameter (mm) orifice with a view to achieving a desirable cooling effect level.

Therein, whether or not the heated mixture medium in the internal space 120 is properly replaced by the low temperature medium may be confirmed readily by use of a pressure graph.

Figure 5A:
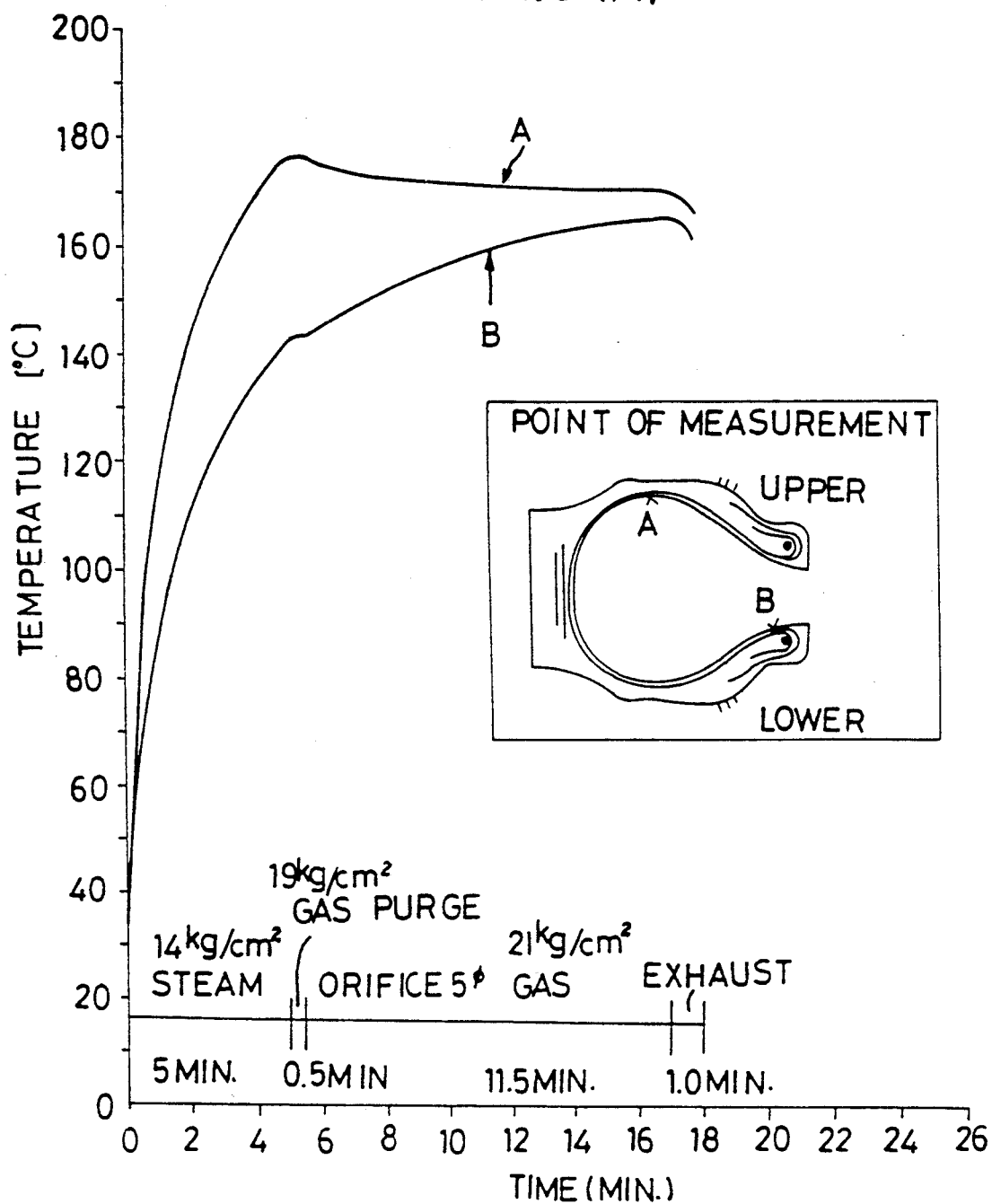
FIG. 5(A) is a graph showing the temperature to time relationship when the gas purge of the second embodiment of the present invention was undertaken immediately after the completion of the supply process of the heating medium.

In the following, an embodiment will be described where the gas vulcanization by a BOM vulcanization machine (at a temperature of 160° C.) was carried out for a light truck tire of 205R16 size incorporated with polyester carcass ply in a manner as shown in FIG. 1 and FIG. 5(A). At the position W of the gas exhaust pipe 115, an orifice having a 5 mm diameter was fitted, and then valves V3 to V5 in the outlet pipe were closed, and the valve V2 of the inlet pipe was opened to supply steam at 14 kg/cm$^2$ pressure. After the lapse of the standard time of 5 min, the valve V2 is closed to stop the supply of steam and concurrently the valves V1 and V4 are opened to introduce a pressure gas having 19 kg/cm$^2$ and 40° C. for 30 sec, thus causing the gas purge cooling operation as shown in FIG. 5(A). That is, by opening only the valve V4 for gas exhaust pipe, the heating medium (pressure: 14 kg/cm$^2$) resident in the internal space 120 is exhausted and instead, a gas at 19 kg/cm$^2$ and 40° C. is introduced to fill the internal space 120. After 30 seconds, as shown in FIG. 5(A), the pressure in the internal space 120 increases to 19 kg/cm$^2$, but assuming that the maximum temperature during the vulcanization should be at 180° C. in view of the physical properties of the carcass material, the temperature of the inner liner of a tire can be set at less than 178° C. in upper side wall portion A at the upper-mold, and the temperature of the bead portion B at the lower mold where cure goes slow can be increased (as indicated by comparison of FIG. 5(A) to FIG. 5(B)). Then, the valve 4 of the gas exhaust pipe 115 is closed, but supply of the gas continues to successively enter into the normal supply process of pressurizing gas. At this time, the pressure of the internal space 120 rises up to 21 kg/cm$^2$, and the temperature of the tire inner liner, exemplified at the upper side wall A, is lowered to about 170° C. However, the temperature of the bead portion B at the lower-mold, as compared to conventional gas vulcanization shown in FIG. 5(C), rises much faster. After 11.5 min, the valve V1 of the gas supply pipe line 113 is closed to stop the gas supply and the valve V4 of the gas exhaust pipe 115 is released to exhaust all gas in the internal space 120 down to zero pressure. Then, by applying vacuum, the bladder 103 is shrunk and taken out, and the mold 102a is opened to take out the vulcanized tire 2, thus the whole cure process comes to an end.

As explained above, the invention features carrying-out of the gas purge cooling, immediately after the completion of the supply process of heating medium and before the following supply process of pressurizing gas, with the use of an orifice, by which the flow rate is adjusted in the "outlet" pipe line of the vulcanization machine for a predetermined period. Thus, avoiding a significant temperature difference between various portions of the elastomer product, and, minimizing unfavorable pressure drop, thereby the temperature of the upper bead or shoulder portion at the lower-mold is effectively prevented from rising excessively while the temperature of the lower bead or shoulder portion is accelerated to speed up the cure of the lower bead or shoulder portion where cure goes slow therefor, thus achieving a homogeneous vulcanization with a shorter time.

Figure 5B:
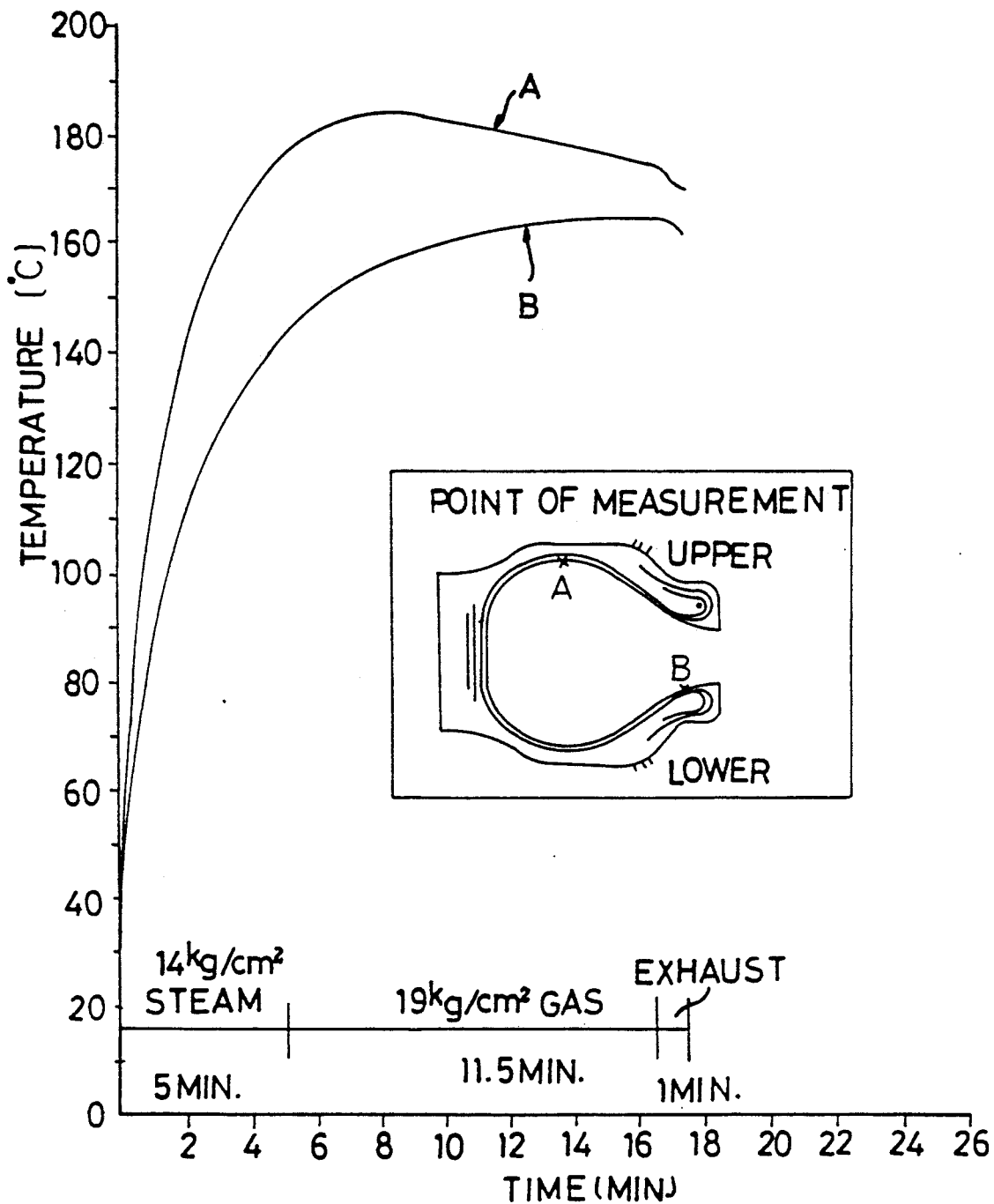
FIG. 5(B) is a graph showing the temperature to time relation for a process where a heating time was prolonged without carrying out the gas purge.
Figure 5C:
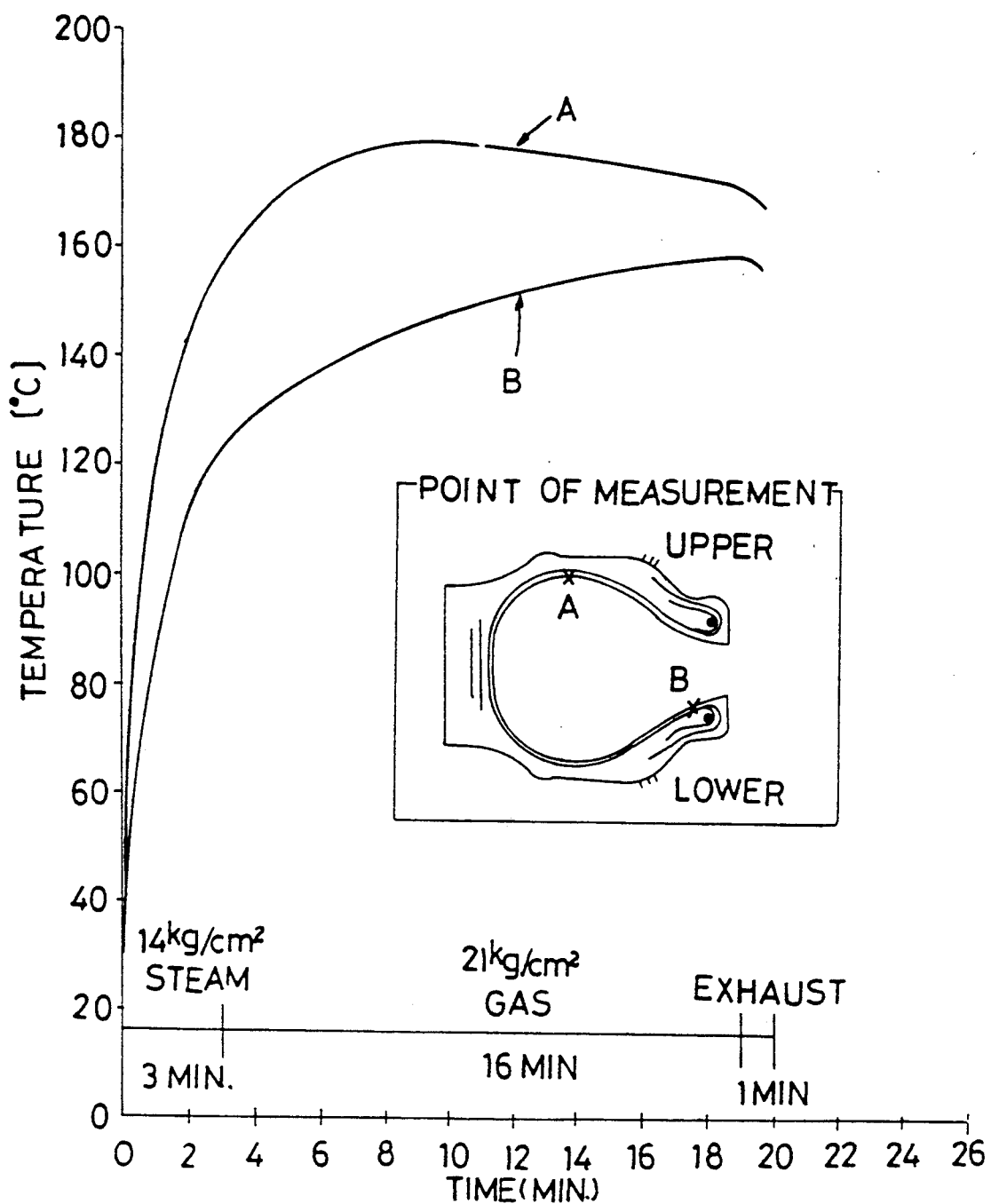
FIG. 5(C) is a graph showing the temperature to time relation for a process where a normal heating time (to avoid overheating of the upper-mold) was employed without cooling by the gas purge.

The following table 1 shows actually determined vulcanization time and, adhesion of a compound to carcass ply with the embodiment in FIG. 5(A) and comparative results (1) and (2) in FIG. 5(B) (C).

From this table, it will be seen and understood that the inventive embodiment in FIG. 5(A) has 2 min shorter vulcanization time compared to the normal vulcanization process (comparative embodiment (2)), and that, as compared to the comparative embodiment (1) which did not use the gas purge and used the same heating period as in the inventive embodiment, the inventive one gives a superior tire, which proves that during vulcanization, temperature difference between the upper and lower portion of the tire was reduced to a smaller level, thus achieving a more uniform vulcanization.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

TABLE 1

|  | Vulcanization Time | Adhesion to Carcass Ply | Temperature Difference (see below) |
|---|---|---|---|
| Inventive Embodiment FIG. 5 (A) | 18.0 min | 100 | 15° C. |
| Comparative Embodiment (1) FIG. 5 (B) | 17.5 min | 95 | 23° C. |
| Comparative Embodiment (2) FIG. 5 (C) | 20.0 min | 100 | 32° C. |

Note: Temperature difference in the table indicates a temperature difference at 10 min after the start of vulcanization between the side wall portion of the upper side wall (A portion) at upper mold and the lower bead (B portion) at the lower-mold.

What is claimed is:

1. A method of curing an elastomer product in a mold, the mold having an inlet and an outlet pipe, the method comprising the steps of:
   placing the elastomer product in the mold;
   supplying a heating steam or gas into an interior of said elastomer product through the inlet pipe to effect vulcanization;
   supplying a cooling pressure gas through said inlet pipe with said outlet pipe opened to replace at least a portion of said heating steam or gas present in the interior of said elastomer product with said cooling pressure gas;
   supplying a pressurizing gas for further pressurizing a mixed gas comprised of said heating steam or gas and said cooling pressure gas present in the interior of said elastomer product through the inlet pipe with the outlet pipe closed; and
   exhausting a mixed gas comprised of said heating steam or gas, said cooling pressure gas and said pressurizing gas present in the interior of said elastomer product at the end of vulcanization.

2. The method of curing an elastomer product as recited in claim 1, wherein the inlet pipe is a single inlet for the mold and the outlet pipe is a single outlet for the mold and wherein the steps of supplying heating steam or gas, of supplying cooling pressure gas and of supplying pressurizing gas supplies the heating steam or gas, the cooling pressure gas and the pressurizing gas to the interior of the elastomer product only through the single inlet and wherein the step of exhausting mixed gas exhausts mixed gas only through the single outlet.

3. The method of curing an elastomer product as recited in claim 1, further comprising the step of controlling discharge of the mixed gas during the step of supplying a cooling pressure gas, the step of controlling comprising using a flow control device mounted in the outlet pipe.

4. The method of curing an elastomer product as recited in claim 1, wherein the steps of placing, of supplying a heating steam or gas, of supplying a cooling pressure gas, of supplying a pressurizing gas and of exhausting a mixed gas are carried out sequentially in the given order.

5. A method of curing an elastomer product in a mold, the mold having an inlet and an outlet pipe, the method comprising the steps of:
   placing the elastomer product in the mold;
   supplying a heating steam or gas into an interior of said elastomer product through the inlet pipe to effect vulcanization;
   supplying a pressurizing gas for further pressurizing said heating steam or gas present in the interior of said elastomer product through the inlet pipe with the outlet pipe closed;
   supplying a cooling pressure gas through said inlet pipe with said outlet pipe opened to replace at least a portion of a mixed gas comprised of said heating steam or gas and said pressurizing gas present in the interior of said elastomer product with said cooling pressure gas; and
   exhausting a mixed gas comprised of said heating steam or gas, said pressurizing gas and said cooling pressure gas present in the interior of said elastomer product at the end of vulcanization.

6. The method of curing an elastomer product as recited in claim 5, wherein the inlet pipe is a single inlet for the mold and the outlet pipe is a single outlet for the mold and wherein the steps of supplying a heating steam or gas, of supplying a pressurizing gas and of supplying a cooling pressure gas supplies the heating steam or gas, the pressurizing gas and the cooling pressure gas to the interior of the elastomer product only through the single inlet and wherein the step of exhausting mixed gas exhausts mixed gas only through the single outlet.

7. The method of curing an elastomer product as recited in claim 5, further comprising the step of controlling discharge of the mixed gas during the step of supplying a cooling pressure gas, the step of controlling comprising using a flow control device mounted in the outlet pipe.

8. The method of curing an elastomer product as recited in claim 5, wherein the steps of placing, of supplying a heating steam or gas, of supplying a pressurizing gas, of supplying a cooling pressure gas and of exhausting a mixed gas are carried out sequentially in the given order.

9. A method of curing an elastomer product in a mold, the mold having an inlet and an outlet pipe, the method comprising the steps of:
   placing the elastomer product in the mold;
   supplying a heating steam or gas into an interior of said elastomer product through the inlet pipe to effect vulcanization;
   supplying a first pressurizing gas for further pressurizing said heating steam or gas present in the interior of said elastomer product through the inlet pipe with the outlet pipe closed;
   supplying a cooling pressure gas through said inlet pipe with said outlet pipe opened to replace at least a portion of a mixed gas comprised of said heating steam or gas and said first pressurizing gas present in the interior of said elastomer product with said cooling pressure gas;
   supplying a second pressurizing gas for further pressurizing a mixed gas comprised of said heating steam or gas, said first pressurizing gas and said cooling pressure gas present in the interior of said elastomer product through the inlet pipe with the outlet pipe closed; and
   exhausting a mixed gas comprised of said heating steam or gas, said cooling pressure gas and said first and second pressurizing gases present in the interior of said elastomer product at the end of vulcanization.

10. The method of curing an elastomer product as recited in claim 9, wherein the inlet pipe is a single inlet for the mold and the outlet pipe is a single outlet for the mold and wherein the steps of supplying heating steam or gas, of supplying a first pressurizing gas, of supplying a cooling pressure gas and of supplying a second pressurizing gas supplies the heating steam or gas, the first pressurizing gas, the cooling pressure gas and the second pressurizing gas to the interior of the elastomer product only through the single inlet and wherein the step of exhausting mixed gas exhausts mixed gas only through the single outlet.

11. The method of curing an elastomer product as recited in claim 9, further comprising the step of controlling discharge of the mixed gas during the step of supplying a cooling pressure gas, the step of controlling comprising using a flow control device mounted in the outlet pipe.

12. The method of curing an elastomer product as recited in claim 9, wherein the steps of placing, of supplying a heating steam or gas, of supplying a first pressurizing gas, of supplying a cooling pressure gas, of supplying a second pressurizing gas and of exhausting a mixed gas are carried out sequentially in the given order.

* * * * *

UNITED STATES PATENT AND TRADEMARK OFFICE
CERTIFICATE OF CORRECTION

PATENT NO. : 5,238,643
DATED : August 24, 1993
INVENTOR(S) : Michihito Kobayashi It is certified that error appears in the above-identified patent and that said Letters Patent is hereby corrected as shown below:

On the title page, item (73), please change the name of assignee from "Sumitomo Rubber Industried Limited" to:

--Sumitomo Rubber Industries Limited--

Signed and Sealed this

First Day of February, 1994

Attest:

BRUCE LEHMAN

*Attesting Officer*  *Commissioner of Patents and Trademarks*